(12) United States Patent
Pang

(10) Patent No.: US 11,093,548 B1
(45) Date of Patent: Aug. 17, 2021

(54) DYNAMIC GRAPH FOR TIME SERIES DATA

(71) Applicant: Wavefront, Inc., Palo Alto, CA (US)

(72) Inventor: Clement Ho Yan Pang, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 227 days.

(21) Appl. No.: 15/689,883

(22) Filed: Aug. 29, 2017

(51) Int. Cl.
*G06F 16/901* (2019.01)
*G06F 16/248* (2019.01)
*G06F 16/2455* (2019.01)

(52) U.S. Cl.
CPC ........ *G06F 16/9024* (2019.01); *G06F 16/248* (2019.01); *G06F 16/24568* (2019.01)

(58) Field of Classification Search
CPC ........... G06F 16/9024; G06F 16/24568; G06F 16/248
See application file for complete search history.

(56) References Cited

U.S. PATENT DOCUMENTS

| | | | | |
|---|---|---|---|---|
| 8,874,755 B1* | 10/2014 | Deklich | .............. | G06F 15/177 709/226 |
| 9,128,965 B1* | 9/2015 | Yanacek | .............. | G06F 16/2282 |
| 2006/0044319 A1* | 3/2006 | Molesky | ................ | G06Q 10/10 345/581 |
| 2012/0023375 A1* | 1/2012 | Dutta | .................. | G06F 11/0754 714/47.2 |
| 2012/0306620 A1* | 12/2012 | Karaffa | .............. | G05B 19/0423 340/6.1 |
| 2013/0275904 A1* | 10/2013 | Bhaskaran | .............. | G06F 3/048 715/771 |
| 2014/0046983 A1* | 2/2014 | Galloway | ............... | G06F 16/29 707/798 |
| 2014/0317019 A1* | 10/2014 | Papenbrock | ........... | G06Q 40/06 705/36 R |
| 2015/0227582 A1* | 8/2015 | Gu | ........................ | G06F 16/958 707/713 |
| 2016/0110409 A1* | 4/2016 | Rao | ..................... | G06F 16/2372 707/696 |
| 2016/0335302 A1* | 11/2016 | Teodorescu | ............... | G06F 8/60 |
| 2016/0357828 A1* | 12/2016 | Tobin | .................... | G06F 16/248 |
| 2017/0201413 A1* | 7/2017 | Marinelli | ............ | G06F 11/3051 |
| 2018/0046950 A1* | 2/2018 | Imamura | ................ | G06Q 50/10 |
| 2018/0095963 A1* | 4/2018 | Verma | ..................... | G06F 40/30 |
| 2018/0225802 A1* | 8/2018 | Vij | ....................... | G06F 16/2282 |
| 2018/0260106 A1* | 9/2018 | Leonard | .............. | G06F 3/04847 |

OTHER PUBLICATIONS

Google Search (Year: 2003).*

* cited by examiner

*Primary Examiner* — Mark D Featherstone
*Assistant Examiner* — Kweku William Halm
(74) *Attorney, Agent, or Firm* — Clayton, McKay & Bailey, PC

(57) ABSTRACT

A method for generating a dynamic graph representation includes receiving time series data, receiving a specification of a relationship between nodes connected by one or more edges in a graph representation to be generated for at least a portion of the time series data, and receiving an identification of a query of the time series data included in a specification of an element of the graph representation. The method further includes executing the query of the times series data, and updating a property of the graph representation using a result of the execution of the query.

20 Claims, 14 Drawing Sheets

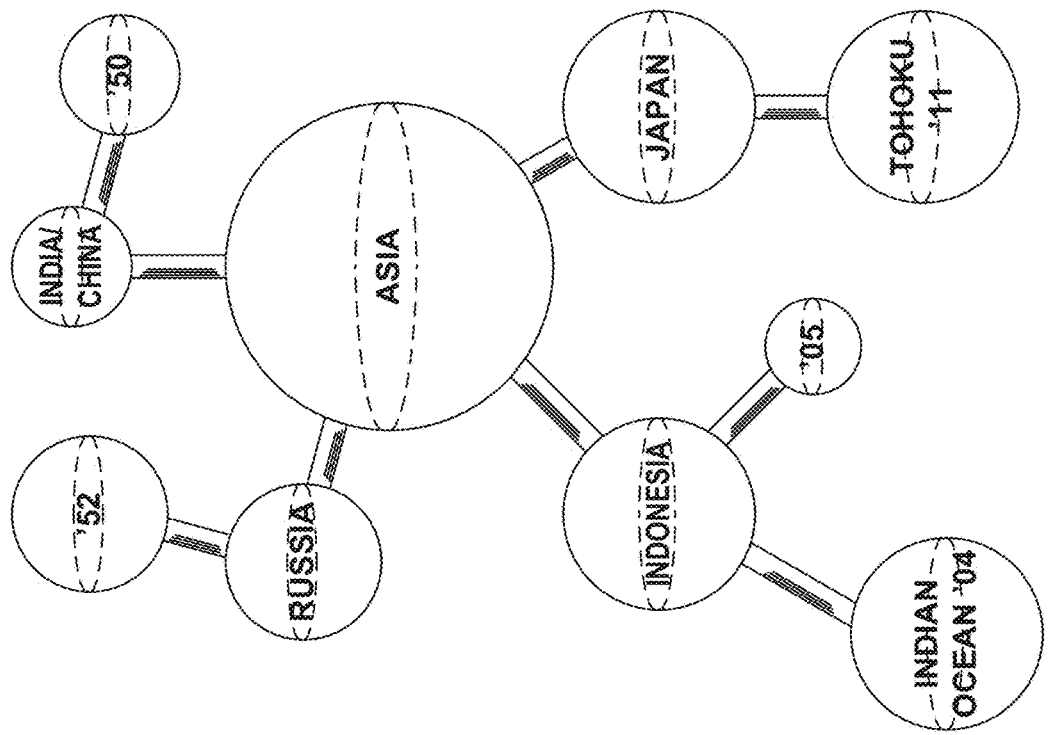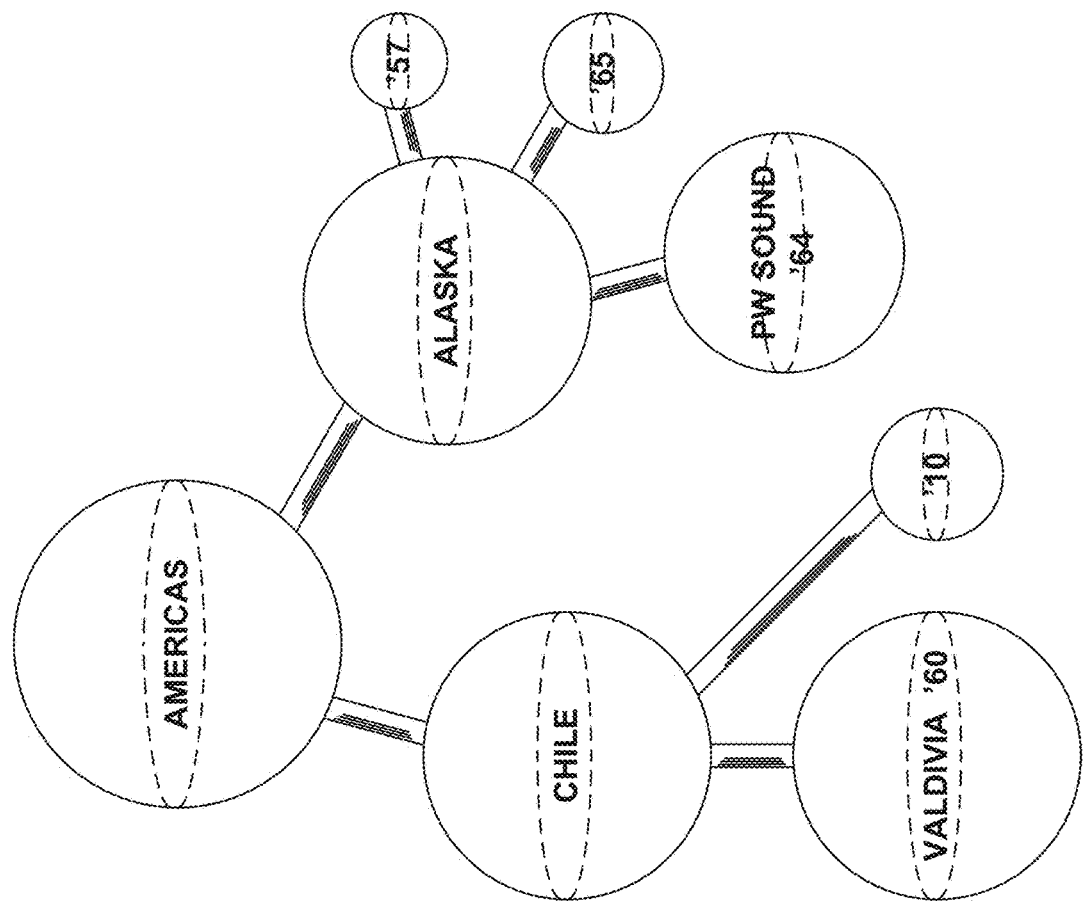
FIG. 7

```
{
  "url": "default",
  "name": "Default Model",
  "rootNodes": [
    {
      "nodeDefinition": "root"
    }
  ],
  "nodeDefinitions": {
    "root": {                                              ⎤ 802
      "name": {
        "raw": "ACME"
      },
      "childrenCollapsedByDefault": true,
      "topLeft": {                                              ⎤ 804
        "raw": "${_value}",
        "queryExpression": "mavg(5m, sum(ts(~sample.requests.total.num, host=app* and env=production)))",
        "units": "rps"
      },
      "topRight": {
        "raw": "${_value}",
        "queryExpression": "mavg(5m, avg(ts(~sample.requests.latency, host=app* and env=production)))",
        "units": "ms"
      },
      "size": "50",
      "color": {
        "r": "255",
        "g": "255",
        "b": "255"
      },
      "children": [
        {                                                  ⎤ 810
          "nodeDefinition": "environment",
          "variables": {
            "env": "dev"
          }
        },
        {                                                  ⎤ 820
          "nodeDefinition": "environment",
          "variables": {
            "env": "production"
          }
        }
      ]
    },
```

FIG. 8A

```
      "environment": {
          "name": {
            "raw": "${env}"
          },
          "childrenCollapsedByDefault": true,
          "topLeft": {
            "raw": "${_value}",
            "queryExpression": "mavg(5m, sum(ts(~sample.requests.total.num, host=app* and env=${env})))",
850         "units": "rps"
          },
          "topRight": {
            "raw": "${_value}",
            "queryExpression": "mavg(5m, avg(ts(~sample.requests.latency, host=app* and env=${env})))",
            "units": "ms"
          },
          "size": "50",
          "color": {
            "r": "255",
            "g": "255",
            "b": "255"
          },
          "children": [
            {
              "queryExpression": "ts(~sample.requests.latency, host=app* and env=${env})",
              "nodeDefinition": "app-node",
              "color": {
860           "r": "if ((${_value} - 150) / 100 as value) < 0.5, 2 * $value, 1.0) * 255",
                "g": "if ((${_value} - 150) / 100 as value) < 0.5, 1.0, 1.0 - 2 * ($value - 0.5)) * 255",
                "b": "0"
              }
            }
          ]
      },
      "app-node": {
          "name": {
            "raw": "${_host}"
          },
          "size": "30",
          "topLeft": {
            "raw": "${_value}",
            "queryExpression": "ts(~sample.requests.total.num, host=${_host})",
            "units": "rps"
          },
          "color": {
            "r": "if ((ts(~sample.cpu.usage.percentage, host=${_host}) as value) < 0.5, 2 * $value, 1.0) * 255",
            "g": "if ((ts(~sample.cpu.usage.percentage, host=${_host}) as value) < 0.5, 1.0, 1.0 - 2 * ($value - 0.5)) * 255",
            "b": "0"
          },
          "topRight": {
            "raw": "${_value}",
            "units": "ms"
          },
          "childrenCollapsedByDefault": true,
```

FIG. 8B

```
      "children": [
        {
          "nodeDefinition": "db-sink"
        }
      ]
    },
    "db-sink": {
      "topLeft": {
        "prefix": "Conn: ",
        "raw": "${_value}",
        "queryExpression": "mavg(5m, sum(ts(~sample.db.connections.active, host=db* and env=${env})))"
      },
      "name": {
        "raw": "Database"
      },                                                                830
      "variablesToDelete": ["_host"],
      "sink": true,
      "topRight": {
        "prefix": "Query Latency: ",
        "raw": "${_value}",
        "queryExpression": "mavg(5m, avg(ts(~sample.db.queries.duration, host=db* and env=${env})))",
        "units": "ms"
      },
      "size": "50",
      "children": [
        {
          "queryExpression": "ts(~sample.db.queries.duration, host=db* and env=${env})",
          "nodeDefinition": "db-node",
          "color": {
            "r": "if ((({_value} - 10) / 100 as value) < 0.5, 2 * $value, 1.0) * 255",
            "g": "if ((({_value} - 10) / 100 as value) < 0.5, 1.0, 1.0 - 2 * ($value - 0.5)) * 255",
            "b": "0"
          }
        }
      ]
    },
    "db-node": {
      "name": {                                                         822
        "raw": "${_host}"
      },
      "size": "30",
      "topLeft": {
        "raw": "${_value}",
        "queryExpression": "ts(~sample.db.queries.num, host=${_host})",
        "units": "qps"
      },
      "color": {
        "r": "if ((ts(~sample.cpu.usage.percentage, host=${_host}) as value) < 0.5, 2 * $value, 1.0) * 255",
        "g": "if ((ts(~sample.cpu.usage.percentage, host=${_host}) as value) < 0.5, 1.0, 1.0 - 2 * ($value - 0.5)) * 255",
        "b": "0"
      },
```

FIG. 8C

```
"topRight": {
    "prefix": "Avg. Query Latency: ",
    "raw": "${_value}",
    "units": "ms"
},
"childrenCollapsedByDefault": true,
"children": [
  {
    "nodeDefinition": "cpu-node",
    "queryExpression": "round(ts(~sample.cpu.usage.percentage, host=${_host}) * 100)"
  },{
    "nodeDefinition": "memory-node",
    "queryExpression": "ts(~sample.mem.used.percentage, host=${_host})"
  },{
    "nodeDefinition": "disk-node",
    "queryExpression": "round(ts(~sample.disk.space.used, host=${_host}) / ts(~sample.disk.space.total, host=${_host}) * 100)"
  },{
    "nodeDefinition": "processes-node",
    "queryExpression": "ts(~sample.process.num, host=${_host})"
  },{
    "nodeDefinition": "network-node",
    "queryExpression": "rate(ts(~sample.db.bytes.sent, host=${_host})) + rate(ts(~sample.db.bytes.recv, host=${_host})) * 1024"
  }
 ]
},
"cpu-node": {                                    ⎤
  "name": {                                      |
    "prefix": "CPU: ",                           |  836
    "raw": "${_value}",                          |
    "units": "%"                                 |
  },                                             ⎦
  "color": {
    "r": "if ((ts(~sample.cpu.usage.percentage, host=${_host}) as value) < 0.5, 2 * $value, 1.0) * 255",
    "g": "if ((ts(~sample.cpu.usage.percentage, host=${_host}) as value) < 0.5, 1.0, 1.0 - 2 * ($value - 0.5)) * 255",
    "b": "0"
  }
},
"disk-node": {                                   ⎤
  "name": {                                      |
    "prefix": "Disk: ",                          |  834
    "raw": "${_value}",                          |
    "units": "%"                                 |
  },                                             ⎦
  "topLeft": {
    "prefix": "Used: ",
    "raw": "${_value}",
    "queryExpression": "ts(~sample.disk.space.used, host=${_host})"
  },
```

FIG. 8D

```
        "topRight": {
            "prefix": "Total: ",
            "raw": "${_value}",
            "queryExpression": "ts(~sample.disk.space.total, host=${_host})"
        },
        "color": {
          "r": "if (${_value} / 100 < 0.5, 2 * ${_value} / 100, 1.0) * 255",
          "g": "if (${_value} / 100 < 0.5, 1.0, 1.0 - 2 * (${_value} / 100 - 0.5)) * 255",
          "b": "0"
        }
      },
      "network-node": {
        "name": {
            "prefix": "if: ",
            "raw": "${_value}",
            "units": "Bps"
        },
        "topLeft": {
          "prefix": "Sent: ",
          "raw": "${_value}",
          "queryExpression": "rate(ts(~sample.db.bytes.sent, host=${_host})) * 1024",
          "units": "Bps"
        },
        "topRight": {
          "prefix": "Recv: ",
          "raw": "${_value}",
          "queryExpression": "rate(ts(~sample.db.bytes.recv, host=${_host})) * 1024",
          "units": "Bps"
        }
      },
      "processes-node": {
        "name": {
            "prefix": "Processes: ",
            "raw": "${_value}"
        },
        "size": "${_value} / 2"
      },
      "memory-node": {
        "name": {
            "prefix": "Mem Usage: ",
            "raw": "${_value}",
            "units": "%"
        },
        "color": {
          "r": "if (${_value} / 100 < 0.5, 2 * ${_value} / 100, 1.0) * 255",
          "g": "if (${_value} / 100 < 0.5, 1.0, 1.0 - 2 * (${_value} / 100 - 0.5)) * 255",
          "b": "0"
        }
      }
    }
  }
}
```

DYNAMIC GRAPH FOR TIME SERIES DATA

BACKGROUND OF THE INVENTION

Performing data analytics especially on large volumes of data generated at a rapid rate can be challenging. Visualizing large sets of data effectively can be challenging. For example, conventional data visualization tools typically display time series data as line charts. However, sometimes line charts do not adequately represent all types of data such as times series data. The charts may be unclear or cluttered. In addition, query handling can be inefficient or frustrating from a user experience perspective. For example, it can be tedious to repeat queries as one drills down into a large data set.

BRIEF DESCRIPTION OF THE DRAWINGS

Various embodiments of the invention are disclosed in the following detailed description and the accompanying drawings.

FIG. 7 is a block diagram illustrating an embodiment of a graph representation for time series data.

FIGS. 8A-8E are diagrams illustrating an embodiment of a specification of a graph representation.

DETAILED DESCRIPTION

Figure 1:
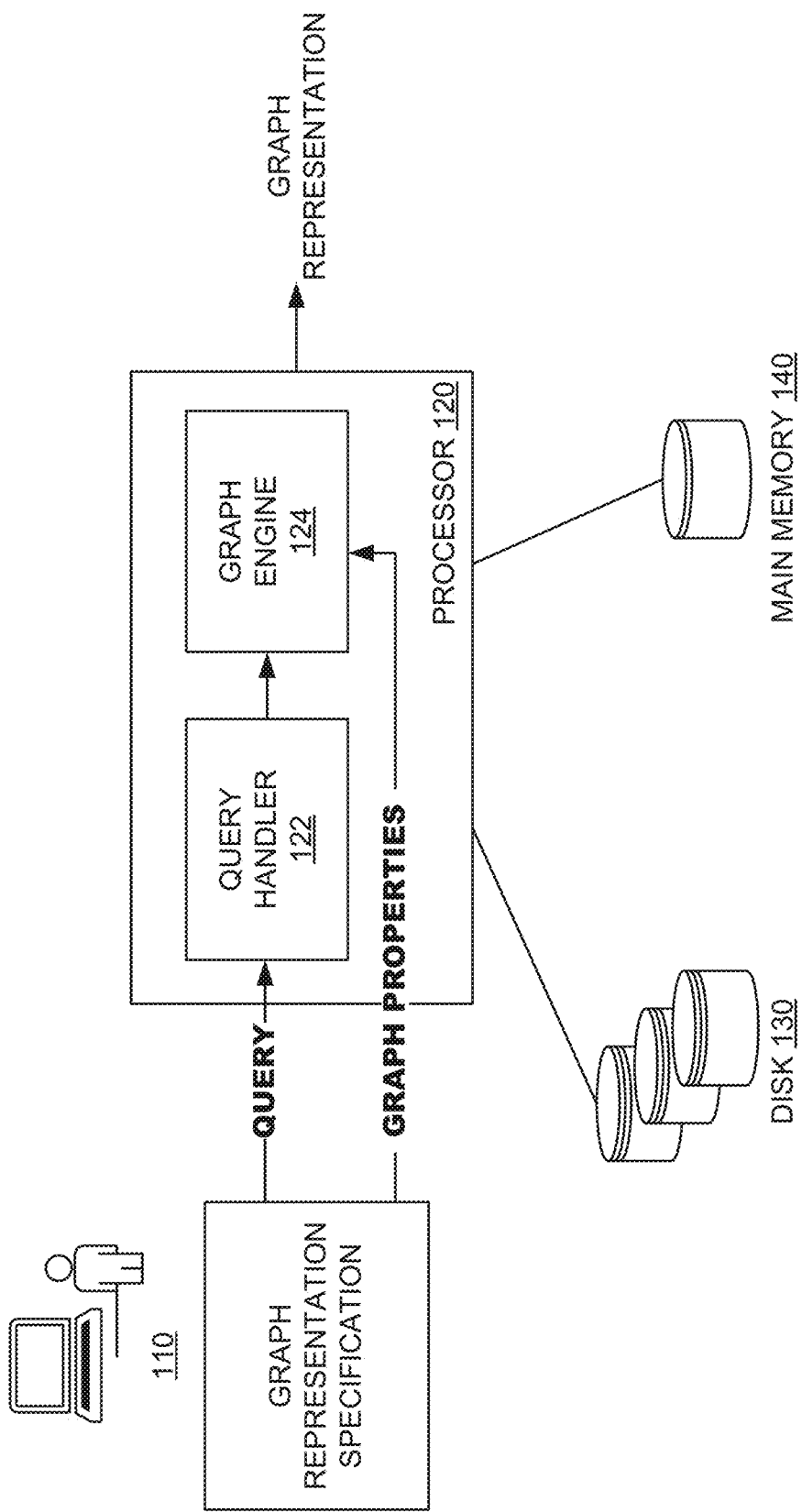
FIG. 1 is a block diagram illustrating an embodiment of a system for generating a dynamic graph representation for time series data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generating a dynamic graph representation to convey information about time series data is disclosed. Conventionally, line charts, which plot data values at various points in time, are used to represent time series data. However, line charts are often inadequate and ineffective representations of time series data because important data segments may be obscured by the volume of data, and relationships between data segments are difficult to highlight as each data segment is typically represented by an independent line.

The techniques described herein may be utilized to generate a dynamic graph representation of time series data. For example, user experience is enhanced compared with conventional line charts by representing the data by a graph representation. In various embodiments, the dynamic graph represents a result of a query on the time series data. For example, information is visually conveyed by a graph representation having elements (e.g., nodes and edges) to represent relationships between data segments or query results. The graph representation may be rendered according to specifiable graph preferences. For example, graph elements have properties defined via a specification to highlight relationships between data segments or problem areas even where the sets of data are relatively large, as further described herein.

The properties of the graph representation can convey information in a more easily interpreted manner compared with conventional line chart representations. In one aspect, the graph representation is interactive and/or aspects of the graph representation can be dynamically updated based on the result of a query. Various visual features of the dynamic graph may direct a user's attention to system components represented by the data. In another aspect, a query may be automatically generated and represented in the graph representation. For example, where two data elements are related (e.g., parent/child relationship such as a data center and constituent database), a query associated with a child element is automatically generated using data from a parent element by populating a query variable with known parent data.

In various embodiments, a method of generating a dynamic graph includes receiving time series data, a specification of a relationship between nodes connected by one or more edges in a graph representation to be generated for at least a portion of the time series data, and an identification of a query of the time series data included in a specification of an element of the graph representation. The method may include executing the query of the times series data and updating a property of the graph representation using a result of the execution of the query.

FIG. 1 is a block diagram illustrating an embodiment of a system for generating a dynamic graph representation for time series data. In the example shown, the system includes client 110, processor 120, disk 130, and main memory 140. The system may handle both discrete data and continuous data.

The client 110 is configured to receive input from and provide output to a user. In this example, the client is configured to receive input in the form of a graph representation specification and provide output in the form of a graph representation. The graph representation specification may include one or more queries and one or more graph properties. A user may make queries via client 110. An answer to the query (here, a graph representation) may be output via a client, e.g., displayed to client 110. In various embodiments, a query is a request about time series data, e.g., time series TS. The time series data may be stored in a storage system such as a time series database (TSDB) (disk 130). Time series data may be discrete or continuous. For example, the data includes live data fed to a discrete stream, e.g., for a standing query. Continuous sources may include analog output representing a value as a function of time. Continuous data may be time sensitive, e.g., reacting to a declared time at which a unit of stream processing is attempted, or a constant, e.g., a 5V signal. Discrete streams may be provided to processing operations (e.g., operations of processor 120) in timestamp order. In various embodiments, if data arrives out-of-order, streams are rewound to process data in order.

Time series data may include groups of data points and have one or more associated tags. The time series data may include a stream of data entries corresponding to values at different points in time. The time series data may be received periodically from various machines. The time series data may be analyzed to determine a status of the machine and/or a source of the data. Using the example of a company that provides and monitors point of sale (POS) devices, a topology of POS devices may be formed by various machines in various regions. Several time series data streams may be collected by the POS devices.

A POS device may report one or more metrics for a data stream. Each reported metric may have any number of tags. Suppose a metric is system battery capacity and a host is described by an operating system of the POS device. Tags associated with this metric and host may include a serial number of the device, a merchant ID, an API URL, a platform, a target (e.g., a U.S. product), a ROM version, an app version, and an app package.

The POS device may report other types of data. For example, a first data stream is temperature detected by a temperature sensor provided in a POS device. For example, temperature is collected every five minutes throughout the day by the sensor. The collected data is stored as a first time series data stream and tagged with an identification of the POS device and geographical location of the POS device. A second data stream may be processing capacity associated with a POS device. For example, the percentage of CPU being used is collected every 30 seconds throughout the day and stored as a second time series data stream. The second time series data stream is tagged with characteristics of the hardware and operating system of the associated POS device and a geographical location of the POS device. The first and second time series data may be analyzed individually or aggregated to provide analytics regarding the POS devices.

For example, queries on the time series data are executed to determine information such as trends in temperature or CPU usage in a particular time period. Suppose one POS device appears sluggish for a fixed period of time each day. A query may be executed on time series data to determine the cause of the sluggishness. For example, the query is for all POS devices with such a pattern of sluggishness. The result of the query may help to identify the cause of the problem such as a faulty software component causing light sensors to misbehave in certain lighting conditions. In various embodiments, a result of the query is represented by a graph. A user may drill down within the graph to explore the topology of the POS devices. Exploring the graph may cause queries to be automatically generated. An example of automatic query generation in response to node selection is further described with respect to FIG. 3.

A user may specify preferences for how an answer to the query is displayed. That is, specifications may be made for display of a query result via client 110. In various embodiments, the user specifies graph properties defining how a graph is displayed. The graph properties may be statically defined or may be dynamic, e.g., changing based on a result of a query on time series data. A graph may include one or more elements. For example, graph properties such as element size, color, behavior, and the like are specified. In some embodiments, default graph properties may be selected automatically by the system without requiring user input regarding graph properties to output a graph representation. A user may adjust default graph properties via a user interface. An example of a specification of graph properties is further described herein with respect to FIG. 4A.

The processor 120 is configured to process input time streams according to queries and graph preferences. In this example, time series data may be processed according to the query received via client 110. Processes performed by processor 120 may generate a graph representation of an answer to the query. The graph representation may be easier to understand compared with conventional data visualizations and may facilitate query handling. The processor 120 may be configured to perform one or more of the processes described herein, e.g., the processes shown in FIGS. 2 and 3. An example of a processor is processor 1002 of FIG. 10.

In particular, in various embodiments, processor 120 processes time series data according to queries and/or specified graph properties as follows. The processor 120 may include a query handler 122 configured to parse, compile, and execute a query. For example, a query is identified from a specification (e.g., structured text specifying a graph representation such as how elements of a graph can dynamically change based on a result of a query on time series data) and provided to the query handler 122. In some embodiments the query handler is configured to parse a query, e.g., translate a received query to a language understandable by a compiler. A compiler may be configured to produce a query execution plan. For example, a compiler determines relevant time series data to retrieve based on the parsed query. One or more operations may be performed on the time series data according to the query execution plan. For example, an executor is configured to fetch data, run data through processing operations, and determine a response to the query based on the execution plan. The parsing, compilation, execution, and graph generation functions may be embodied in one or more processing modules. For example, multiple functions are combined in a single processing module.

In various embodiments, the processor 120 includes a graph engine 124. The graph engine may be configured to receive graph properties. The graph engine may generate a graph representation to convey information about time series data, which may include a query result. For example, the graph engine renders a graph representation of an answer to a query on the time series data according to graph properties selected by the system and/or provided by a user. In various embodiments, the graph engine maps one or more time series onto a map node. For example, a query is automatically generated using inherited parent node information. A query for a child node may be formed by replacing variables with the inherited parent information. The result of executing the automatically-generated query allows additional information to be displayed on the graph. For example, appearance of the map nodes is adjusted in response to changes in the environment, e.g., within a user interface, and reactions to the environment. The graph engine may display the answer to the query in an effective manner, for example, taking into account the type of information being displayed. Using the example of a topology of servers in a server system, the graph representation may more clearly convey information about each of the servers and server subcomponents compared with conventional line charts.

The disk 130 is configured to store data. In various embodiments, disk 130 is a non-volatile memory configured to store time-series data and/or other types of data. For example, disk 130 stores telemetry data, which may include an association between a value and a customer, metric, host, timestamp, and one or more tags. Disk 130 may store index data, which may include an association of a last reported value or time and a customer, one or more tags, metric, and host. In various embodiments, disk 130 stores graph preferences.

The main memory 140 is configured to store data. In various embodiments, main memory 140 is a volatile memory that stores data that is quickly retrievable in response to queries (e.g., main memory 140 behaves like a cache). In various embodiments, after accessing a first set of data in disk 130, a copy of the first set of data is stored in main memory 140 to facilitate faster retrieval for subsequent queries involving the first set of data. In various embodiments, main memory 140 stores graph preferences.

In this example, one or more queries and one or more graph properties are encapsulated in a graph representation specification as shown. Queries and/or graph properties may be defined in a specification, e.g., defined in structured text and/or via user input to a UI as further described herein. The processor 120 may identify the query and graph properties from the specification and provide the query to the query handler 122 and the graph properties to a graph engine 124. The query handler 122 may compile queries and instruct an executor to execute a query by performing one or more operations on time series data to generate a query result. The time series data may be looked up via disk 130 and/or main memory 140. A graph representation may be rendered to convey information about time series data, which may include a query result.

In operation, the system shown in FIG. 1 receives a query and one or more graph preferences via client 110. The query is parsed and translated to a language understandable by the compiler. The compiler determines what to retrieve from time series databases (disk 130) based on the query. For example, the compiler determines how many scans to make on the time series databases. The compiler then hands off commands to an executor to perform an execution phase, e.g., beginning execution of the query. The executor then outputs an answer to the query to a graph engine 124. The answer to the query may include one or more datastreams. The graph engine renders a graph according to the received graph preferences and outputs the answer to the query in the form of a graph representation. In some embodiments, the graph engine aggregates two or more streams and represents the aggregated information in the form of a graph.

Figure 2:
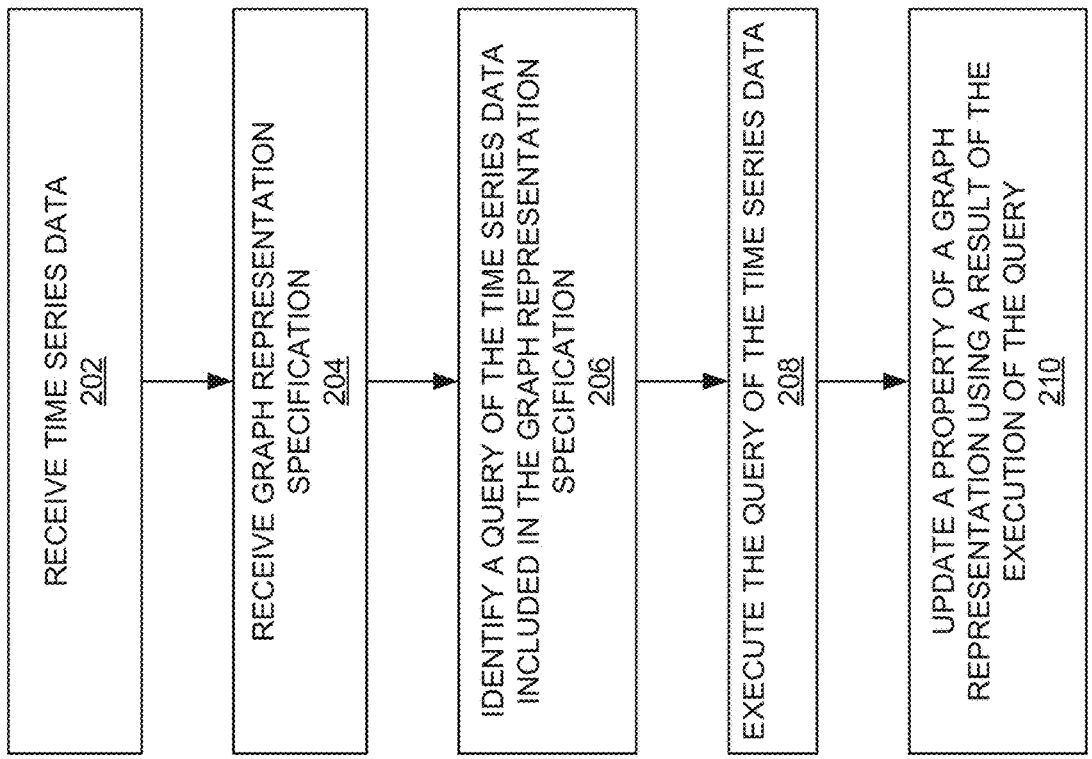
FIG. 2 is a flow chart illustrating an embodiment of a process for generating a dynamic graph representation for time series data.

FIG. 2 is a flow chart illustrating an embodiment of a process for generating a dynamic graph representation for time series data. The process of FIG. 2 may be at least in part implemented on one or more components of the system shown in FIG. 1. For example, the process of FIG. 2 is implemented by processor 120 with respect to input from client 110 and disk 130. In some embodiments, the process of FIG. 2 is performed by processor 1002 of FIG. 10. In some embodiments, a user interacts with the process of FIG. 2 using the graphical user interface of FIG. 5.

At 202, times series data is received. Time series data may include one or more data streams. A data stream may include one or more groups of data points and have one or more associated tags. The time series data may be received periodically from various machines. For example, a collector deployed on a machine collects time series data for that machine. Time series data may be collected for one or more machines within a topology and stored in a time series database such as disk 130 of FIG. 1. In some embodiments, time series data may include an aggregation of one or more data streams. Example time series data includes a stream of data entries corresponding to values at different points in time such as sensor collected information (e.g., temperature), resource utilization (e.g., disk, CPU, memory usage), resource capacity (e.g., battery capacity, CPU capacity), and the like. Additional examples of time series data are described with respect to FIG. 1.

In various embodiments, time series data is mapped to a graph according to the process shown here. In some embodiments, tags or data elements of a time series data stream are represented by respective nodes in the graph representation. For example, for time series data corresponding to a data center having a plurality of databases, the data center is a root node and the databases are children nodes in a graph representation. In various embodiments, a relationship between two nodes is represented by an edge connecting the nodes. For instance, a parent node and a child node may be connected by an edge to represent the parent-child relationship. Examples of graph representations are shown in FIGS. 4A-7.

Figure 9:
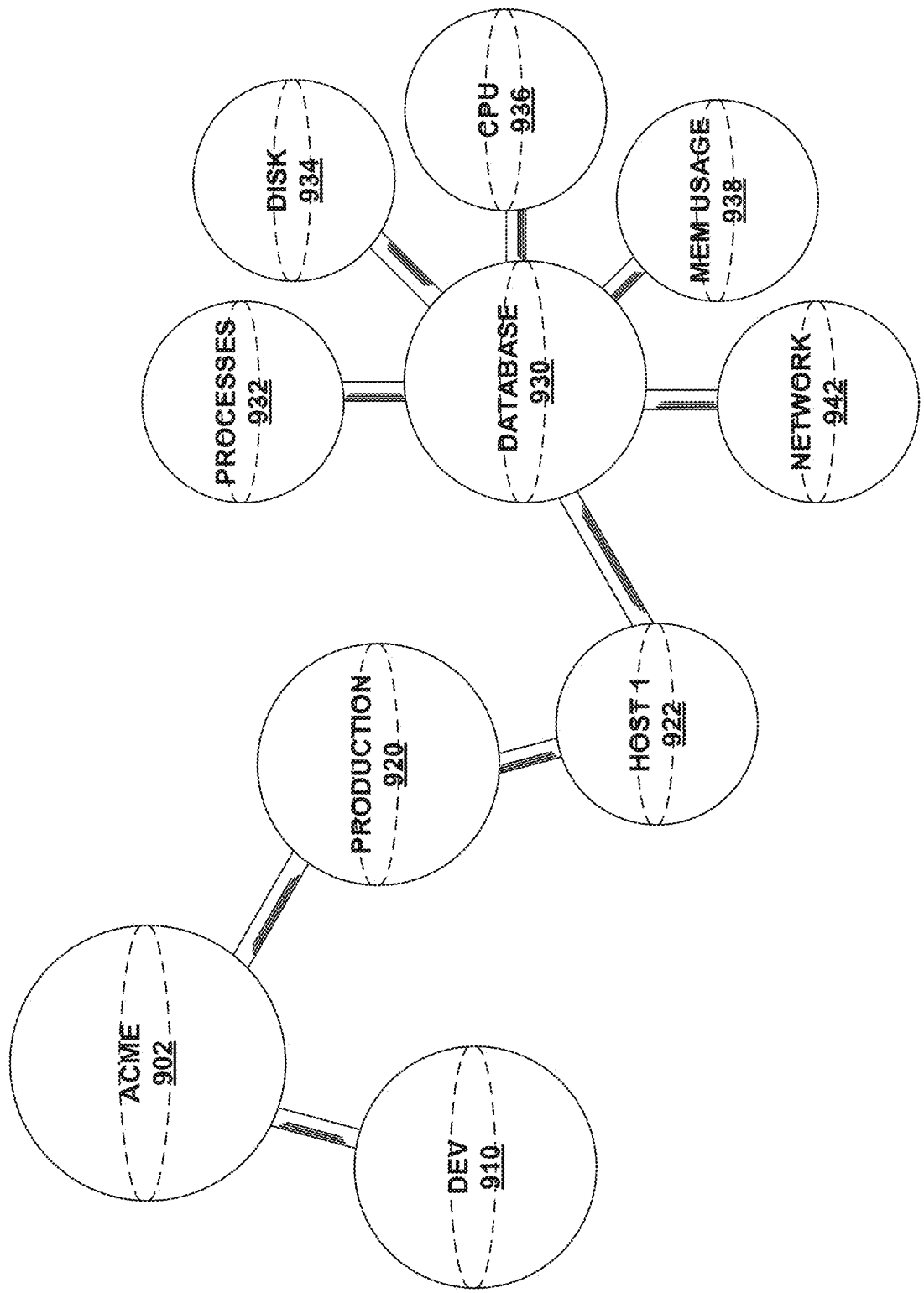
FIG. 9 is a block diagram illustrating an embodiment of a graph representation for time series data.

At 204, a graph representation specification is received. The graph representation specification may define one or more relationships between nodes connected by one or more edges in a graph representation to be generated for at least a portion of the time series data. A graph representation may be customized by generating the graph representation based at least in part on a graph representation specification. The specification may define properties of a graph such as existence, identifiers (also referred to as a "tag"), relationships, appearances of various graph elements, etc. The properties may be statically defined (e.g., statically defined default graph property) or dynamic, e.g., responding to a query result. Additional examples of graph representation specifications are further described with respect to FIG. 1. The specification may be provided in various formats including structured text such as JavaScript Object Notation (JSON) or program code. An example of a specification is shown in FIGS. 8A-8E and an example of a corresponding graph representation is shown in FIG. 9.

The specification may define one or more properties of a graph. For example, the specification includes a node definition, which defines the existence, identifier, appearance, and/or behavior of the node. Existence of a node refers to whether the node is rendered/shown in a graph representation. An identifier of a node refers to a description of a node such as a tag, name, or the like. Appearance of a node includes size and color.

Figure 4A:
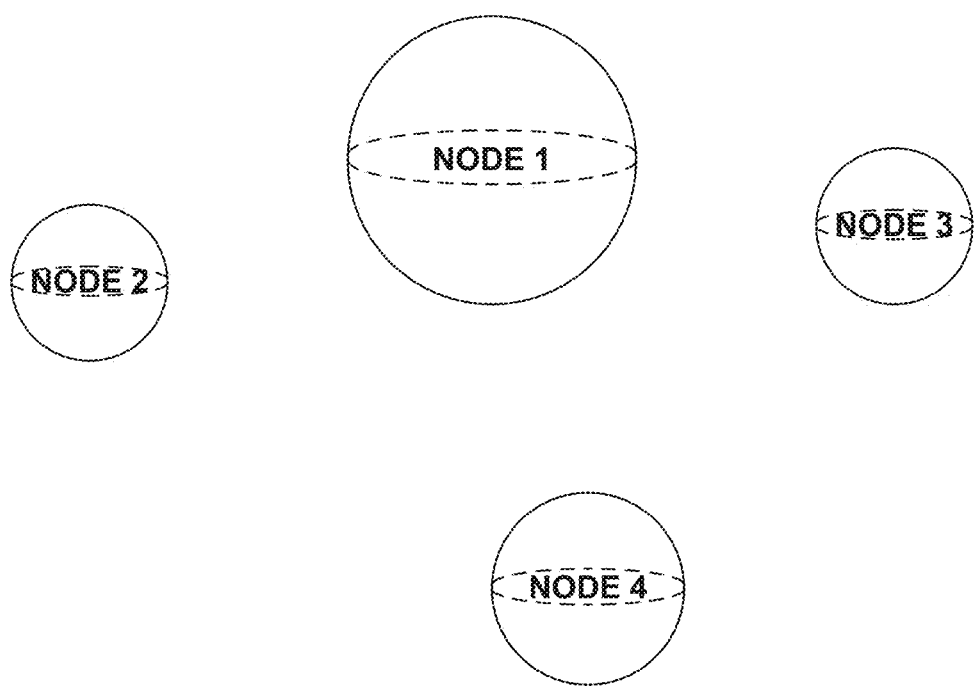
FIG. 4A is a block diagram illustrating an embodiment of a graph representation for time series data.

The specification may include an edge definition, which defines the existence, identifier, appearance, and/or behavior of the edge. Existence of an edge refers to whether the edge is rendered/shown in a graph representation. An identifier of an edge refers to a description of a node such as a tag, name, or the like. Appearance of an edge includes size and color. Behavior of a node may include changes in appearance of the node (e.g., blinking or other animation). Example appearance attributes of an edge include directionality, size (e.g., thickness), and color. Example behavior attributes of an edge include changes in appearance of the edge (e.g., blinking or other animation). The directionality of an edge may convey information about a relationship between nodes connected by the edge. For example, an edge points from a parent to a child in some embodiments or the edge may point from a child to a parent in some embodiments. Examples of node and edge appearance and behavior are shown in FIG. 4B.

In various embodiments, a specification is provided for a type of node or a type of edge. All nodes of the specified type may be rendered with the same properties (e.g., size). Similarly, all edges of the specified type may be rendered with the same properties (e.g., size). Nodes may be of the same type if they represent a same or similar component in a topology. Edges may be of the same type if they represent a same or similar relationship between two nodes (e.g., a parent-child relationship is a first type while a grandparent-grandchild relationship is a second type, etc.). By allowing for the definition of groups of elements of the graph (e.g., types of nodes or types of edges), the graph is easily customizable because a user need not define aspects of each node and instead can define aspects of several nodes at once. In various embodiments, a child node inherits one or more properties of a parent node. In various embodiments, a property of a child node is automatically selected based on a property of a parent node. For example, a child node is 25% smaller in size than a parent node.

Any type of relationship may be defined by the specification. In various embodiments, the specification defines a hierarchical relationship between nodes. For example, the specification defines that nodes of a first type are children of nodes of a second type. As another example, the specification may define that a parent-child relationship is to be represented by an edge having one or more properties (e.g., size, color, etc.).

In various embodiments, a grouping of nodes is represented by a sink node. A sink node defines a grouping of sub-nodes. In various embodiments, the behavior of the sink node includes grouping sub-nodes such that the sub-nodes collapse in response to a command with respect to the sink node. The sink node may be defined to change in size in response to a command with respect to the sink node. For example, the sink node deletes or replaces variables or reduces a time series query by a specified dimension. In one aspect, a sink node facilitates data exploration by collapsing sub-nodes in response to a command. In another aspect, the visual representation of a sink node facilitates user experience allowing aspects of the graph representation to be hidden or abstracted. An example of a sink node is Node 1 of FIGS. 4A and 4B. FIG. 4B shows a graph representation in an expanded state, while FIG. 4A shows a graph representation in a collapsed state. Node Sub 1 and its children may be collapsed into Node 1 as shown in FIG. 4A.

Figure 5:
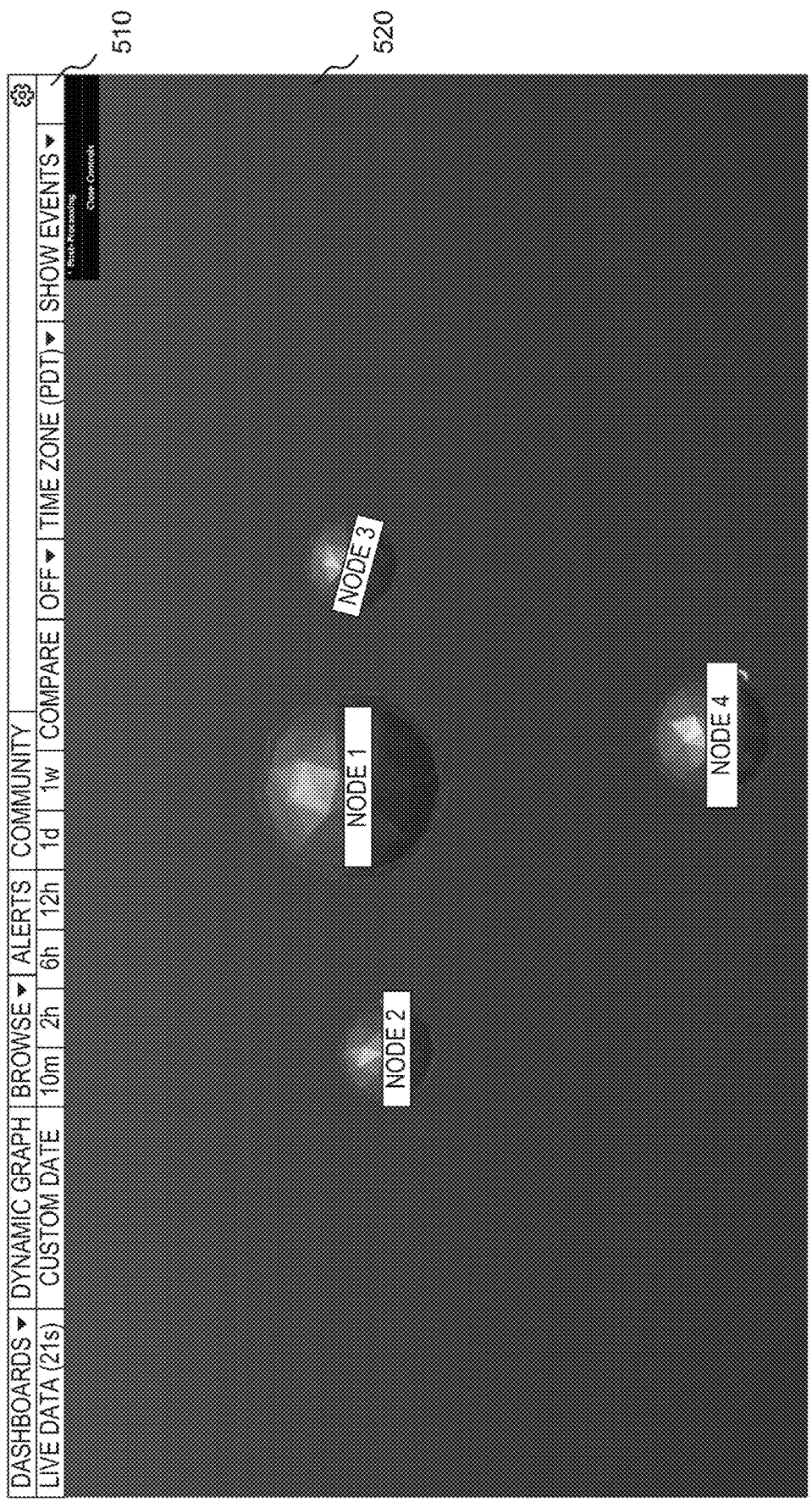
FIG. 5 is a block diagram illustrating an embodiment of a graphical user interface including a graph representation for time series data.

In various embodiments, the specification is defined by user input to a graphical user interface such as a dashboard. An example of a graphical user interface is shown in FIG. 5. In various embodiments, the specification is defined by structured text such as a JSON script or other type of script. The specification may be defined by a combination of methods. For example, the specification is initially defined by structured text, then later modified by user input to the graphical user interface.

At 206, a query of the time series data included in the graph representation specification is identified. In some embodiments, the query may be identified from a query provided by a user. For example, first level nodes are generated from user queries. Children nodes of first level nodes may be generated from automatically composed queries, as further described herein. In some embodiments, the query may be identified from an automatically generated query. An automatically generated query may be formed from information about one or more parent nodes. Time series data may be mapped to graph elements. That is, graph elements may represent a result of execution of one or more associated queries. In various embodiments, properties and/or elements of a graph representation are dynamically modified based on a query result. An example of a query expression is query expression 804 shown in FIG. 8A.

Returning to FIG. 2, at 208, the query of the time series data is executed. An example of query execution is described with respect to FIG. 1. For example, an operation is to be performed on time series data such as retrieving all POS devices with a particular pattern of sluggishness by returning values below a threshold. In various embodiments, the execution results in one or more data streams. The one or more data streams may be mapped to one or more nodes of a graph. In various embodiments, one or more tags of a time series are used to create a node. For example, a node is labeled with one or more tags of the time series. The tag may be artificially created or may be associated at the time of collection with a data stream. Examples of query execution and graph representations are described with respect to FIGS. 7 and 8A-9.

At 210, a property of a graph representation is updated using a result of the execution of the query. A property of the graph includes any aspect of the graph's appearance. For example, a property includes a size of a node, a color of a node, behavior (e.g., rate of blink or switching between two colors) of a node, etc. The property of the node may convey information about data. Examples of information conveyed by properties of the graph are described with respect to FIG. 4A. The property of the graph representation may be determined based on a specification (e.g., the specification received at 204), and the graph representation may be rendered accordingly. The rendered graph representation may be interactive. For example, when a user interacts with the graph, a query is executed to generate a query result, and the query result is represented on an updated graph representation. For example, the updated graph representation includes an expanded node to convey additional information relative to a previous version of the graph representation.

In various embodiments, a graph property is updated in response to user selection of a graph element. For example, a graph element such as a node or edge is selected by a user (e.g., via touch screen). As another example, a graph element may be selected using an editing function of a graphical user interface. An attribute of the graph element (e.g., color, size, behavior, etc.) may be changed or defined. An example of a dashboard is shown in FIG. 5.

A node in a graph may represent a data stream returned by a query. Each node may be expandable. For example, additional queries are executed for a node or data stream. Expansion of a node may visually represent the result of the additional queries. A query may be automatically generated by substituting a variable in a query with a parent's value for that variable. In various embodiments, in response to user selection and manipulation of a graph representation, a query is automatically generated and executed. The graph representation may be updated to reflect a result of additional query execution. For example, a node is expanded and additional information determined and rendered. When a node is expanded, a query is generated using the node information by replacing variables with known information to generate a new query. The new query is executed and the result is shown in an updated graph representation. An example of automatic query generation is shown in FIG. 3.

In some embodiments, it may be determined whether a type of received time series data is suitable for representation by a graph. If the received time series data is not suitable for representation by a graph, then the time series data is represented by other formats such as a line chart or conventional data representation format. Some types of time series data may be better suited for representation by a graph instead of a line chart. In some instances, time series data representing topologies and clusters is more intelligible when represented as a graph instead of a line chart. Time series data rendered by a graph representation may have associated dataflows. If the received time series data is suitable for representation by a graph, a graph representation of the time series data is generated according to 204-210.

Figure 3:
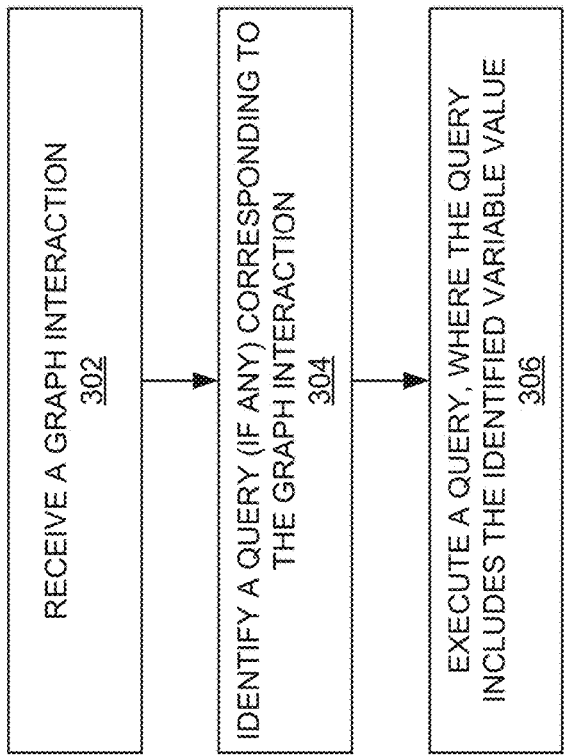
FIG. 3 is a flow chart illustrating an embodiment of a process for executing a query on times series data.

FIG. 3 is a flow chart illustrating an embodiment of a process for executing a query on times series data. The process of FIG. 3 may be at least in part implemented on one or more components of the system shown in FIG. 1. For example, the process of FIG. 3 is implemented by processor 120 with respect to input from client 110 and disk 130. In some embodiments, the process of FIG. 3 is performed by processor 1002 of FIG. 10. In some embodiments, a user interacts with the process of FIG. 3 using the graphical user interface of FIG. 5.

At 302, a graph interaction is received. A graph interaction includes a user interaction with a graph representation. For example, the user makes a request to expand a node, contract a node, move (e.g., drag, rotate, pan) at least a portion of the graph representation, and the like. For example, a user selects a node on a graph for expansion. Referring to FIG. 4A, a user may select one of the nodes for expansion. When a user requests to expand a node, information about children of a node may be revealed in the graph representation. Using the example of a topology of database servers being represented by the graph of FIG. 4A, Node 1 represents database servers in Region A, Node 2 represents database servers in Region B, Node 3 represents database servers in Region C, and Node 4 represents database servers in Region D. Suppose a user wishes to see additional information about Node 1 (e.g., information about datacenters within Region A). The user may select Node 1 to expand that node. To display additional information about Node 1, a query may be automatically generated on time series data relevant for displaying the additional information.

Returning to FIG. 3, at 304, a query, if any, corresponding to the graph interaction, is identified. The query may be identified from a specification. For example, a specification provided as structured text is parsed and a query expression corresponding to the graph interaction is identified. The identification of the query may include determining corresponding time series data and retrieving the data to prepare for execution of the query on associated time series data. In some embodiments, a data stream corresponding to the node and a variable value is identified and/or retrieved from storage. In various embodiments, a node in a graph represents a data stream for a particular tag or variable. Thus, each node has a corresponding data stream. Some nodes may have parent nodes. Using the example of FIG. 4B, the parent of node Sub 1 is Node 1. The data stream corresponding to node Sub 1 may be generated by further filtering the data stream of its parent. That is, a query on time series data to generate the data stream corresponding to node Sub 1 includes a variable/tag of its parent node. In various embodiments, the query is identified based on structured text (e.g., JSON) specifying how to update properties of the node and/or what query expression to run to generate an element of the graph representation.

At 306, the identified query is executed. The query may be executed by a query handler such as query handler 122 of FIG. 1. For example, the query is parsed, compiled, and executed. The query may be identified from a specification. If applicable, the query is executed using parent data. For example, parent data, which is accessible to children, is used for the identified variable value. In various embodiments, children of parent nodes can access parent data. Thus, to generate a query corresponding to the child, a query may be made by replacing a variable with a parent node variable value(s). For example, suppose a query for a parent node (Node 1) is "ts(Region A, . . . )." A query for a child node (Node Sub 1) would be "ts(Region A, DataCenter 1, . . . )." If information about a parent node is known, the query for the child node may be automatically generated by replacing the first variable in the query with "Region A." FIG. 4B is an example of a graph in which child node Sub 1 is determined based on an automatically generated query. In the example of FIG. 4B, a series of queries are automatically generated resulting in the rendering of children and grandchildren nodes of Node 1. Whether children and grandchildren nodes are automatically generated may be specified by a user, e.g., via a graph specification. For example, where a node is defined to be closed by default, a query corresponding to the children of the node closed by default is not automatically generated. In various embodiments, a query execution plan is created. One or more operations may be performed on the time series data according to the query execution plan. Data is fetched and run through processing operations to determine a response to the query based on the execution plan.

Following 306, the process may proceed to execute and generate a graph representation of the result. For example, the process returns to 208 of FIG. 2.

FIG. 4A is a block diagram illustrating an embodiment of a graph representation for time series data. The graph representation of FIG. 4A may be generated by the process shown in FIG. 2. In this example, data streams are represented by a plurality of 3D stacks (nodes) in a graph. Here, the graph representation includes four nodes: Node 1, Node 2, Node 3, and Node 4. The four nodes each represents a different data stream. For example, a node represents a group of hosts, modules, or other machines within a topology. In various embodiments, a child node can access data of parent nodes. That is, values may be passed by a parent to its children and pushed down an entire branch. The graph representation may be 2D or 3D. In some embodiments, the graph is interactive. In some embodiments, the graph is dynamically updated.

A user may rotate, pan, or otherwise view the graph representation from different perspectives. The user may issue commands through a graphical user interface such as the one shown in FIG. 5. The user interface may be responsive to touch input, mouse input, or other types of input. A node may be expanded or collapsed at the command of a user. In some embodiments, the model may rotate automatically or be animated automatically allowing a user to view various aspects of the graph representation without issuing any commands. In various embodiments, the way graph elements are displayed represents information about the graph elements.

For example, a point rate of the node is conveyed by the node's size, color, behavior, or other property. The point rate may reflect how many datapoints (or points per second) are collected for the node. Selecting a property of the node according to point rate may quickly allow a user to see which data sets are relatively large. For example, a node is sized according to the point rate such that the higher the point rate, the larger the node. A color of a node may reflect its point rate. For example, those nodes with a point rate meeting a first threshold are a first color and those nodes with a point rate meeting a second threshold are a second color.

As another example, a status of a node, operational states, or alerts may be represented by a size, color, behavior, or other property of a node. A status, operational state, or alert may include failures, overloading, or other system events that may affect the performance of a particular machine, link, or system. For example, a color of a node indicates whether there is an alert for data related to the node. A node having a failure rate below a first threshold may be green while a node having a failure rate above the first threshold and below a second threshold may be orange, and a node having a failure rate above the second threshold may be red. In various embodiments, the color is defined in structured text, e.g., by specifying RGB proportional values. In various embodiments, the color is defined via a user interface by user selection of predefined or custom colors.

A behavior of a node may indicate a status, operational state, or alert associated with a node. A change in appearance of a node or edge may indicate a possible error. The changing appearance may draw attention to a portion of the graph representation/topology. This may enhance user experience by allowing a user to quickly assess problematic areas even where data sets are large. In various embodiments, a relatively small issue corresponds to a slower blink rate than a relatively larger issue. For example, if more than a threshold number of machines are affected, a faster blink rate is used.

The change in appearance may include selection between two colors. For example, a node or edge is displayed alternately between the two colors, causing a blinking effect. The selection of the colors provides information about a status of a node or edge. For example, a moderate issue corresponds to blinking between orange and an original node color while a severe issue corresponds to blinking between red and an original node color. The color of the node and/or blinking properties may be defined by a user via a graph preferences specification or set to a system default.

A shape of a node may represent information about the node. For example, a node type is assigned to a particular shape. A node in a 2D graphical representation may be represented by a circle, polygon, or other shape. A node in a 3D graphical representation may be represented by a cube, cone, polyhedron, or other shape. In various embodiments, a node represents a conceptual grouping of data. For example, for POS terminals, a mobile device is represented by a first shape, a tablet is represented by a second shape, and a custom device is represented by a third shape.

Similarly, information about a link between two nodes may be represented by a size, color, behavior, or other property of an edge. For example, a color of an edge represents a status of the edge. For example, if there might be a problem in a connection between two machines, the edge is rendered in a color different from other edges that do not have a possible problem.

FIG. 4B is a block diagram illustrating a first view of an embodiment of a graph representation for time series data. The graph representation of FIG. 4B may be generated by the process shown in FIG. 2. Here, the graph includes one top-level node (Node 1) and one second-level node (Sub 1). FIG. 4B is an example of a graph representation with Node 1 expanded to reveal sub-node Sub 1.

For example, selecting "Node 1" in FIG. 4A results in the graph representation shown in FIG. 4B. In the example of FIG. 4B, one or more nodes have been rearranged relative to FIG. 4A, e.g., rendered to accommodate the updated graph representation. FIG. 4B may be generated automatically or dynamically without re-loading the entire page. For example, in the graph representation shown in FIG. 4B, the expansion of Node 1 causes other nodes of the same level (Node 2, Node 3, and Node 4) to disappear. In some embodiments (not shown), the expansion of Node 1 does not cause other nodes of the same level to disappear. Instead, the other nodes may be automatically re-arranged to accommodate expanded Node 1.

In various embodiments, the nodes are dynamically updated, e.g., in response to new time series data that is collected. A node may be defined to be open or closed by default. For example, one or more nodes are closed by default. A threshold may be set such that those nodes having values below the threshold are closed by default to focus a user's attention on those nodes having values exceeding the threshold.

Figure 6:
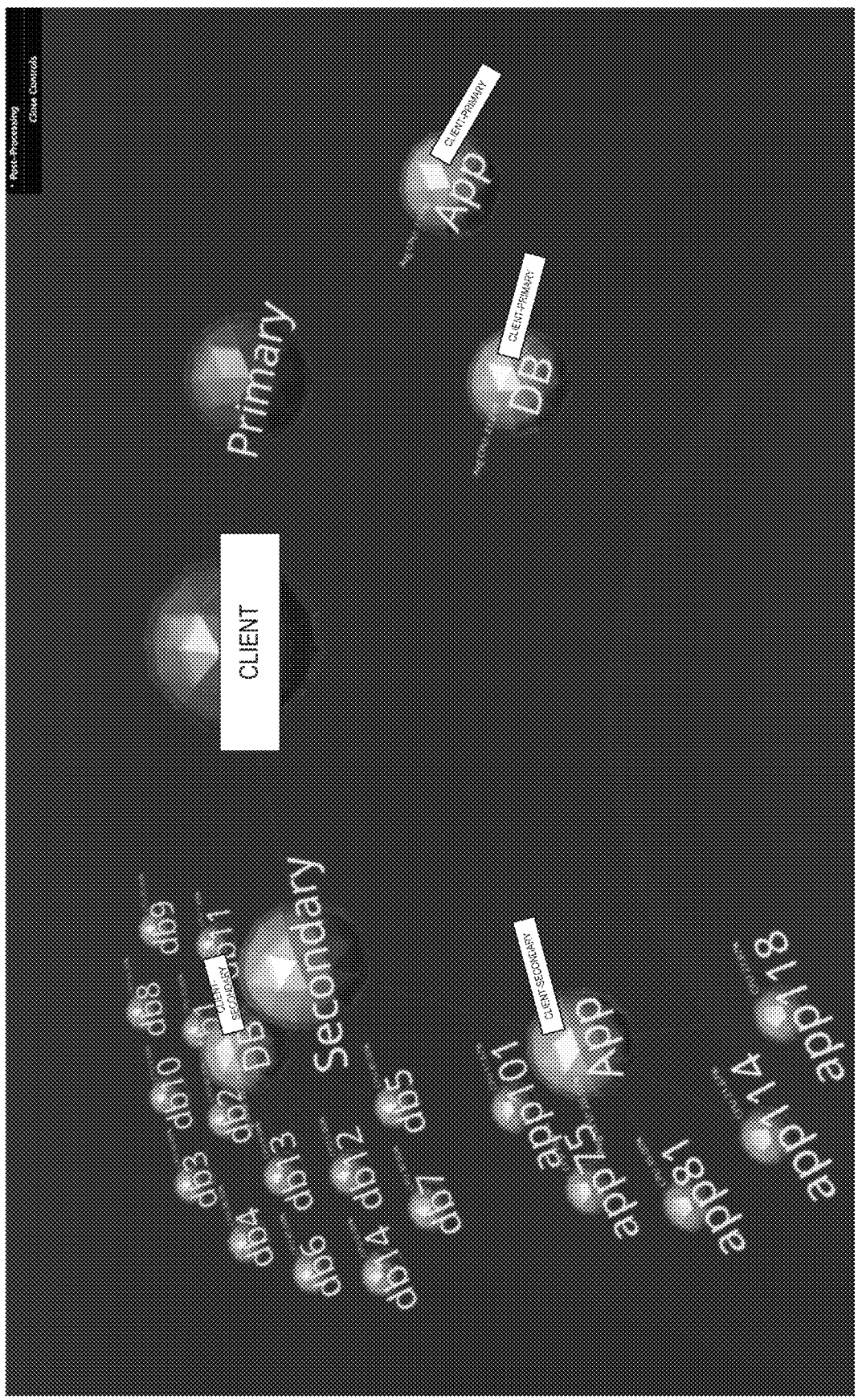
FIG. 6 is a block diagram illustrating an embodiment of a graphical user interface including a graph representation for time series data.

Although not shown, the node may be displayed with data values. For example, a first value is displayed in a top-left portion of the node and a second value may be shown in the top-right portion of the node. An example of values is shown in FIG. 6. There, CPU usage percentages are shown to the top right of app nodes.

Figure 4C:
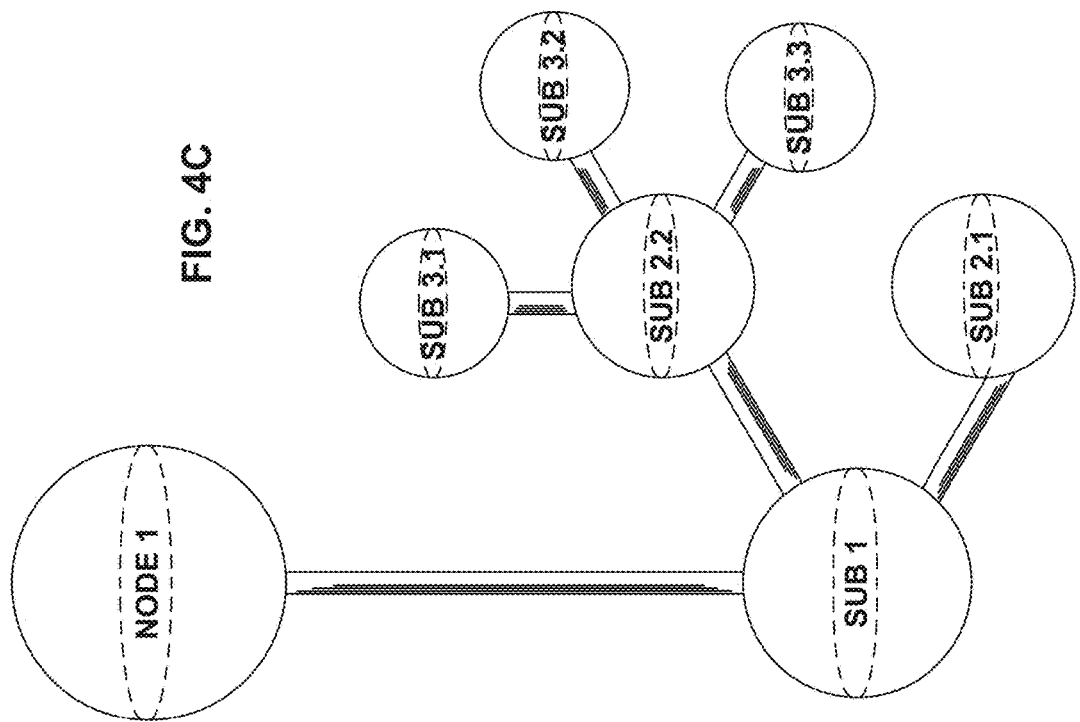
FIG. 4C is a block diagram illustrating a second view of an embodiment of a graph representation for time series data.
Figure 4B:
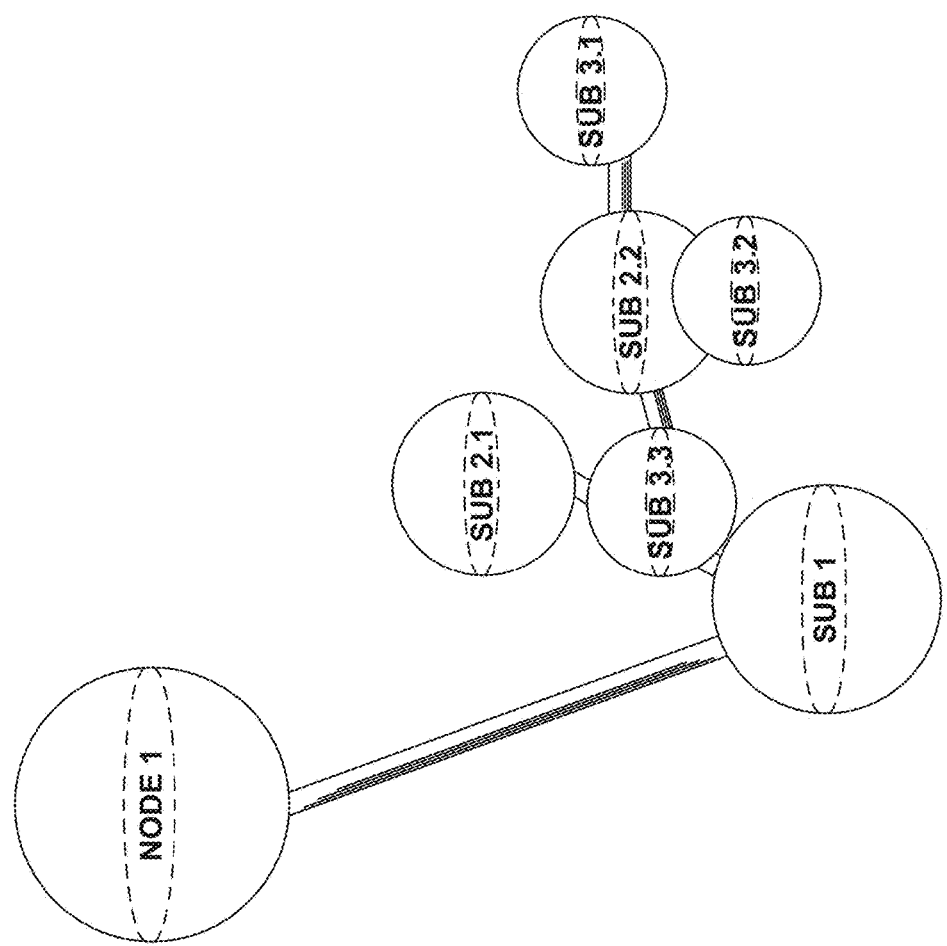
FIG. 4B is a block diagram illustrating a first view of an embodiment of a graph representation for time series data.

FIG. 4C is a block diagram illustrating a second view of an embodiment of a graph representation for time series data. The graph representation of FIG. 4C may be generated by the process shown in FIG. 2. The graph representation of FIG. 4C may include the same content as the graph representation of FIG. 4B. The graph representation of FIG. 4C shows a different perspective of the same graph representation.

For example, a user moves the graph representation of FIG. 4B on the UI, e.g., by panning, rotating, etc. to result in the graph representation of FIG. 4C. The user may do this by clicking and dragging the graph representation or touching and moving the graph representation on a touch-sensitive screen, among other techniques. The ability to show the graph representation from different perspectives allows a user to examine different aspects of the graph representation. This may also improve the clarity of the graph representation by allowing a user to drill down on particular nodes of the graph representation.

The graph representation in FIG. 4B shows nodes Sub 3.1, Sub. 3.2, and Sub 3.3 positioned about a plane bisecting node Sub 2.2 substantially horizontally. The graph representation in FIG. 4C shows nodes Sub 2.1 and Sub. 2.2 rotated about an axis to display node Sub 2.2 positioned about a plane bisecting node Sub 2.2 substantially vertically. For example, if there is text on a node that is obscured by another node, the other node can be moved out of the way automatically or manually to view the text. Suppose text on the bottom of node Sub 2.2 is obscured by one of the nodes, e.g., Sub 3.2. In FIG. 4C, this text is viewable.

FIG. 5 is a block diagram illustrating an embodiment of a graphical user interface including a graph representation for time series data. The graph representation of FIG. 5 may be generated by the process shown in FIG. 2.

The graphical user interface shown in FIG. 5 includes a first portion 510 and a second portion 520. In this example, a graph representation of time series data is displayed in the second portion 520. The graph representation may rendered according to the techniques described herein. FIGS. 4A, 4B, 6, 7, and 8 are examples of graph representations.

The first portion 510 may include on or more elements allowing a user to define graph preferences. The graph representation rendered in the second portion 520 may be displayed based on the graph preferences. In this example, the elements include a dropdown menu to show "Dashboards." A button "Dynamic Graph" allows a user to select a format of a display. For example, the data represented by a dynamic graph is represented by another format such as a line chart in response to user selection of a different format of display. A dropdown menu "Browse" allows a user to browse a data stream represented by the graph representation. A button "Alerts" may display a summary of alerts associated with the data displayed in the graph representation. For example, a pop-up window is displayed with alerts such as servers that are overloaded. A button "Community" allows a user to view a topology of a system displayed in the graph representation.

In various embodiments, filters on data streams or results of queries on time series data are defined via the dashboard. In this example, the data stream is live data with a history of 21 seconds. A button "Custom Date" allows a user to define a custom date range for which to display data. One or more buttons with time ranges may be displayed, allowing a user to select a time range of data to display. In this example, the time ranges are: 10 minutes, 2 hours, 6 hours, 12 hours, 1 day, and 1 week. The graph representation in second portion 520 may be compared with other data using the "Compare" button shown in this example dashboard. In various embodiments, one or more layers can be turned on or off. For example, UI elements allow labels on nodes to be turned on or off. A time zone for the data may be specified. In this example, the time zone is PDT. One or more events may be specified to be displayed via dropdown menu "Show Events."

FIG. 6 is a block diagram illustrating an embodiment of a graphical user interface including a graph representation for time series data. The graph representation of FIG. 6 may be generated by the process shown in FIG. 2.

The graphical user interface shown in FIG. 6 represents a client's database and application system. The client's entire system is represented by the "Client" node. In this example, the client includes a primary sub-system and a secondary sub-system. The primary sub-system includes applications and databases, each of which is represented by a node. In this example, associated data is displayed on a top left (average CPU usage) and top right (client-primary). The secondary sub-system includes various applications and databases. Each of the applications and databases is represented by a respective node. Associated values may be displayed on the top left and top right of the node as shown.

FIG. 7 is a block diagram illustrating an embodiment of a graph representation for time series data. The graph representation of FIG. 7 may be generated by the process shown in FIG. 2.

The graph representation of FIG. 7 represents the data shown in Table 1 shown below. This data may correspond to the result of a query for: 10 largest earthquakes since 1950.

TABLE 1

| Continent | Country | Sub-region | Magnitude |
|---|---|---|---|
| Americas | Chile | Valdivia (1960) | 9.4-9.6 |
| Americas | Alaska | Prince William Sound (1964) | 9.2 |
| Asia | Indonesia | Indian Ocean (2004) | 9.1-9.3 |
| Asia | Japan | Tohoku (2011) | 9.0-9.1 |
| Asia | Russia | Kamchatka (1952) | 9.0 |
| Americas | Chile | Offshore Maule (2010) | 8.8 |
| Americas | Alaska | Rat Islands (1965) | 8.7 |
| Americas | Alaska | Andreanof Islands (1957) | 8.6 |
| Asia | India/China | Assam/Tibet (1950) | 8.6 |
| Asia | Indonesia | Nias-Simeulue (2005) | 8.6 |

In the example shown in FIG. 7, the size of the country node is the largest earthquake seen in that country. In an alternative embodiment, the size of the country node may be an average of earthquake sizes seen for that country. The sizing of the country node to reflect a largest sub-value, smallest sub-value, average sub-value, or some other value may be specified in a specification of graph preferences.

FIG. 8A is a diagram illustrating an embodiment of a specification of a graph representation. FIG. 8B is a diagram illustrating an embodiment of a specification of a graph representation. FIG. 8C is a diagram illustrating an embodiment of a specification of a graph representation. FIG. 8D is a diagram illustrating an embodiment of a specification of a graph representation. FIG. 8E is a diagram illustrating an embodiment of a specification of a graph representation. In this example, the specification of FIGS. 8A-8E is JSON code. The specification may be made in other formats or a combination of other formats. The specification may define the appearance of the graph shown in FIG. 9.

Section 802 is an example of a definition of a root node, in this case "ACME." Section 802 corresponds to node 902 in FIG. 9. The specification may include a query. For example, query expression 804 defines a format of a query corresponding to a query that may be performed on time series data. In this case, the result of the query may be displayed in the top left of the node (not shown).

Section 810 is an example of a definition of child node "dev." Section 810 corresponds to node 910 in FIG. 9. Section 820 is an example of a definition of child node "production." Section 820 corresponds to node 920 in FIG. 9. Section 830 of FIG. 8C is an example of a definition of child node "Database." Section 830 corresponds to node 930 in FIG. 9.

Returning to FIG. 8B, section 850 is an example of a definition of how children nodes 910, 920, and 930 look. For example, the specification defines whether children are collapsed by default, queries to product values in the top left and/or top right of the node, a size of the node, and color of the node.

Section 860 is an example of a definition of defining color variations corresponding to value variations. For example, a proportion of red or green making up the color of the node depends on the value of a query result. This may flag anomalies or values meeting a threshold to enhance user experience.

Section 822 of FIG. 8C is an example of a definition of a child host node. In this example, the value of ${_host} is represented by "Host 1" node 922 of FIG. 9.

Section 836 of FIG. 8D is an example of a definition of child node "CPU." Section 836 corresponds to node 936 in FIG. 9. Section 834 of FIG. 8D is an example of a definition of child node "Disk." Section 834 corresponds to node 934 in FIG. 9. Section 842 of FIG. 8E is an example of a definition of child node "Network." Section 842 corresponds to node 942 in FIG. 9. Section 832 of FIG. 8E is an example of a definition of child node "Processes." Section 832 corresponds to node 932 in FIG. 9. Section 838 of FIG. 8E is an example of a definition of child node "Mem Usage." Section 838 corresponds to node 938 in FIG. 9. In this example, children nodes "Processes," "Disk," "CPU," "Mem Usage," and "Network" are children of database node 930 of FIG. 9 and grandchildren of root node ACME 902 of FIG. 9.

FIG. 9 is a block diagram illustrating an embodiment of a graph representation for time series data. The graph representation of FIG. 9 may be generated by the process shown in FIG. 2.

The graph representation of FIG. 9 represents a topology in a computer system. The top level node is the company, in this example, "Acme." The second level nodes are development ("Dev"), "Production," and "Database." Each of the second level nodes may include on or more sub-nodes representing sub-components or sub-processes. In this example, database performance may be measured by third level nodes "processes," "disk," "CPU," "mem usage," and "network." Information about database performance may be represented according to specified graph preferences as further described herein. For example, if the system is about to run out of memory, the memory node is displayed in a particular color, animated, or otherwise visually distinguished. In this example, a third level node is "Host 1." Host 1 may be related to production and database as shown.

Figure 10:
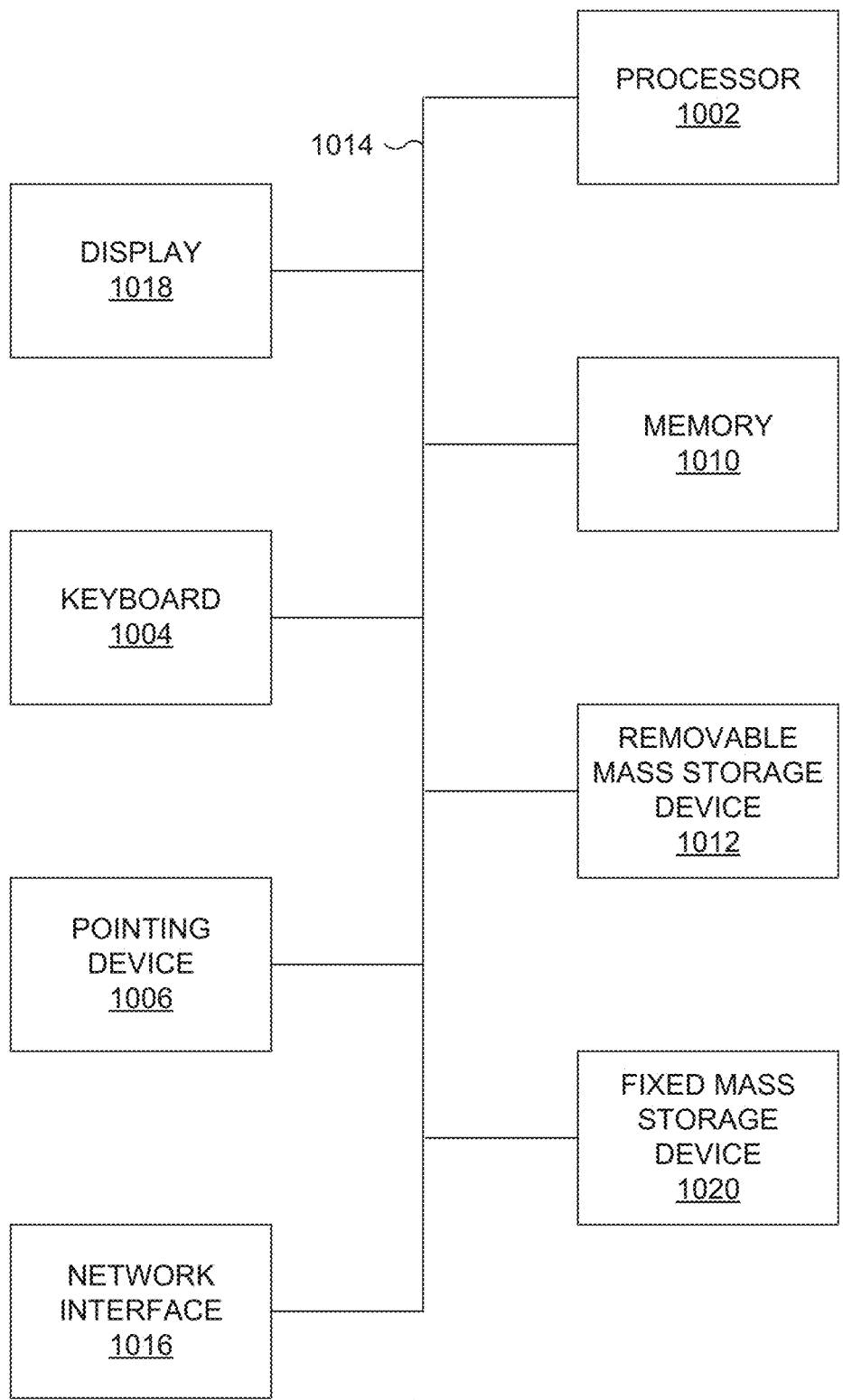
FIG. 10 is a functional diagram illustrating a programmed computer system for generating a dynamic graph representation for time series data in accordance with some embodiments.

FIG. 10 is a functional diagram illustrating a programmed computer system for generating a dynamic graph representation for time series data in accordance with some embodiments. As will be apparent, other computer system architectures and configurations can be used to perform the described graph generation technique. Computer system 1000, which includes various subsystems as described below, includes at least one microprocessor subsystem (also referred to as a processor or a central processing unit (CPU) 1002). For example, processor 1002 can be implemented by a single-chip processor or by multiple processors. In some embodiments, processor 1002 is a general purpose digital processor that controls the operation of the computer system 1000. In some embodiments, processor 1002 also includes one or more coprocessors or special purpose processors (e.g., a graphics processor, a network processor, etc.). Using instructions retrieved from memory 1010, processor 1002 controls the reception and manipulation of input data received on an input device (e.g., image processing device 1006, I/O device interface 1004), and the output and display of data on output devices (e.g., display 1018).

Processor 1002 is coupled bi-directionally with memory 1010, which can include, for example, one or more random access memories (RAM) and/or one or more read-only memories (ROM). As is well known in the art, memory 1010 can be used as a general storage area, a temporary (e.g., scratch pad) memory, and/or a cache memory. Memory 1010 can also be used to store input data and processed data, as well as to store programming instructions and data, in the form of data objects and text objects, in addition to other data and instructions for processes operating on processor 1002. Also as is well known in the art, memory 1010 typically includes basic operating instructions, program code, data, and objects used by the processor 1002 to perform its functions (e.g., programmed instructions). For example, memory 1010 can include any suitable computer readable storage media described below, depending on whether, for example, data access needs to be bi-directional or uni-directional. For example, processor 1002 can also directly and very rapidly retrieve and store frequently needed data in a cache memory included in memory 1010.

A removable mass storage device 1012 provides additional data storage capacity for the computer system 1000, and is optionally coupled either bi-directionally (read/write) or uni-directionally (read only) to processor 1002. A fixed mass storage 1020 can also, for example, provide additional data storage capacity. For example, storage devices 1012 and/or 1020 can include computer readable media such as magnetic tape, flash memory, PC-CARDS, portable mass storage devices such as hard drives (e.g., magnetic, optical, or solid state drives), holographic storage devices, and other storage devices. Mass storages 1012 and/or 1020 generally store additional programming instructions, data, and the like that typically are not in active use by the processor 1002. It will be appreciated that the information retained within mass storages 1012 and 1020 can be incorporated, if needed, in standard fashion as part of memory 1010 (e.g., RAM) as virtual memory.

In addition to providing processor 1002 access to storage subsystems, bus 1014 can be used to provide access to other subsystems and devices as well. As shown, these can include a display 1018, a network interface 1016, an input/output (I/O) device interface 1004, an image processing device 1006, as well as other subsystems and devices. For example, image processing device 1006 can include a camera, a scanner, etc.; I/O device interface 1004 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 1000. Multiple I/O device interfaces can be used in conjunction with computer system 1000. The I/O device interface can include general and customized interfaces that allow the processor 1002 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1016 allows processor 1002 to be coupled to another computer, computer network, or telecommunications network using a network connection as shown. For example, through the network interface 1016, the processor 1002 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 10 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 1004 and display 1018 share the touch sensitive screen component, which both detects user inputs and displays outputs to the user). In addition, bus 1014 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving time series data regarding a plurality of servers in a datacenter;
   receiving a specification of a relationship between nodes connected by one or more edges in a graph representation to be generated for at least a portion of the time series data, wherein the nodes comprise parent nodes corresponding to servers and child nodes corresponding to server sub-systems;
   receiving an identification of a query of the time series data included in a specification of an element of the graph representation, wherein the query requests information regarding an alert produced by a server of the plurality of servers within a specified time period, the alert being based on the server exceeding an alert threshold relating to at least two of server temperature, server utilization, and server capacity;
   executing the query of the times series data; and
   updating a property of the graph representation using a result of the execution of the query, wherein updating the property of the graph comprises displaying a summary of the information regarding the alert,
   wherein a node of the graph representation represents a data stream returned by the query, and
   wherein the node representing the data stream provides a visual representation of a point rate of the data stream, the point rate being at least one of a number of data points and a number of data points per unit of time for the node.

2. The method of claim 1, wherein the property of the graph representation is updated automatically and dynamically.

3. The method of claim 1, wherein the property of the graph representation includes a size of a node.

4. The method of claim 1, wherein the property of the graph representation includes a rate at which a node blinks.

5. The method of claim 1, wherein the property of the graph representation includes a data value displayed with a node.

6. The method of claim 1, wherein at least one property of the graph representation is unchanged in response to the result of the execution of the query.

7. The method of claim 1, wherein the visual representation is at least one of the node's size, color, and behavior.

8. The method of claim 1, wherein a node of the graph representation represents a conceptual grouping of data.

9. The method of claim 1, wherein a node of the graph representation represents a module in a system.

10. The method of claim 1, wherein the graph representation includes at least one parent node and at least one child node, the at least one child node having access to data of a respective parent node.

11. The method of claim 1, wherein the graph representation includes a three-dimensional graph rendered on a display.

12. The method of claim 1, wherein the graph representation is interactive and rotatable.

13. The method of claim 1, wherein the specification of the relationship between the nodes in the graph representation includes a specification of an object type for a node or edge to reuse a configuration.

14. The method of claim 1, wherein the specification of the relationship between the nodes in the graph representation defines a hierarchical relationship between the nodes.

15. The method of claim 1, wherein the specification of the relationship between the nodes in the graph representation is by structured text.

16. The method of claim 1, wherein the specification of the relationship between the nodes in the graph representation includes specifying a plurality of nodes connecting back to a single sink node.

17. The method of claim 1, further comprising aggregating a plurality of query execution results and wherein the updating the property of the graph representation includes representing the aggregation of the plurality of query execution results.

18. The method of claim 1, wherein the execution of the query includes:
   determining data to be fetched from the received time series data based on the query;
   fetching the determined data;
   executing at least one operation on the fetched data; and
   providing a response to the query based on the execution of the at least one operation.

19. A system, comprising:
   a processor configured to:
      receive time series data regarding a plurality of servers in a datacenter;

receive a specification of a relationship between nodes connected by one or more edges in a graph representation to be generated for at least a portion of the time series data, wherein the nodes comprise parent nodes corresponding to servers and child nodes corresponding to server sub-systems;

receive an identification of a query of the time series data included in a specification of an element of the graph representation, wherein the query requests information an alert produced by a server of the plurality of servers within a specified time period, the alert being based on the server exceeding an alert threshold relating to at least two of server temperature, server utilization, and server capacity;

execute the query of the times series data;

update a property of the graph representation using a result of the execution of the query; and a display configured to display the graph representation, wherein updating the property of the graph comprises displaying a summary of the information regarding the alert, wherein a node of the graph representation represents a data stream returned by the query, and wherein the node representing the data stream provides a visual representation of a point rate of the data stream, the point rate being at least one of a number of data points and a number of data points per unit of time for the node.

20. A computer program product, the computer program product being embodied in a non-transitory computer readable storage medium and comprising computer instructions for:

receiving time series data regarding a plurality of servers in a datacenter;

receiving a specification of a relationship between nodes connected by one or more edges in a graph representation to be generated for at least a portion of the time series data, wherein the nodes comprise parent nodes corresponding to servers and child nodes corresponding to server sub-systems;

receiving an identification of a query of the time series data included in a specification of an element of the graph representation;

executing the query of the times series data, wherein the query requests information regarding an alert produced by a server of the plurality of servers within a specified time period, the alert being based on the server exceeding an alert threshold relating to at least two of server temperature, server utilization, and server capacity; and updating a property of the graph representation using a result of the execution of the query, wherein updating the property of the graph comprises displaying a summary of the information regarding the alert, wherein a node of the graph representation represents a data stream returned by the query, and wherein the node representing the data stream provides a visual representation of a point rate of the data stream, the point rate being at least one of a number of data points and a number of data points per unit of time for the node.

* * * * *